(12) United States Patent
Shepherd et al.

(10) Patent No.: US 7,024,674 B2
(45) Date of Patent: Apr. 4, 2006

(54) DISC PLAYER IMPROVEMENTS

(75) Inventors: David Shepherd, Edinburgh (GB); Andrew Evans, Livingston (GB)

(73) Assignee: Infinite Data Storage, (GB)

( * ) Notice: Subject to any disclaimer, the term of this patent is extended or adjusted under 35 U.S.C. 154(b) by 65 days.

(21) Appl. No.: 10/289,195

(22) Filed: Nov. 6, 2002

(65) Prior Publication Data

US 2003/0107971 A1    Jun. 12, 2003

(30) Foreign Application Priority Data

Nov. 23, 2001  (GB)  .................................... 0127228

(51) Int. Cl.
*G11B 7/08*          (2006.01)
(52) U.S. Cl. ..................................... 720/692
(58) Field of Classification Search ............. 369/263.1; 720/679, 684, 692–694
See application file for complete search history.

(56) References Cited

U.S. PATENT DOCUMENTS

| | | | |
|---|---|---|---|
| 4,539,612 A * | 9/1985 | Sidhu et al. | 369/261 |
| 5,936,927 A | 8/1999 | Soga et al. | |
| 6,034,941 A | 3/2000 | Ro | |
| 6,292,455 B1 * | 9/2001 | Saruwatari et al. | 720/692 |
| 6,381,091 B1 * | 4/2002 | Takizawa et al. | 360/97.01 |
| 2002/0021655 A1 | 2/2002 | Shin | |
| 2002/0089101 A1 * | 7/2002 | Itakura | 267/136 |

\* cited by examiner

*Primary Examiner*—George Letscher
(74) *Attorney, Agent, or Firm*—Workman Nydegger

(57) ABSTRACT

A disc player that incorporates a single piece disc enclosure and a chassis section is described. The incorporation of the disc enclosure and the chassis section into a single piece eliminates the requirement for a separate damping system. As well as reducing the cost of manufacturing the device this also allows for the tolerance between the spindle motor and the disc enclosure to be precisely controlled so enabling miniaturization of the disc player.

9 Claims, 5 Drawing Sheets

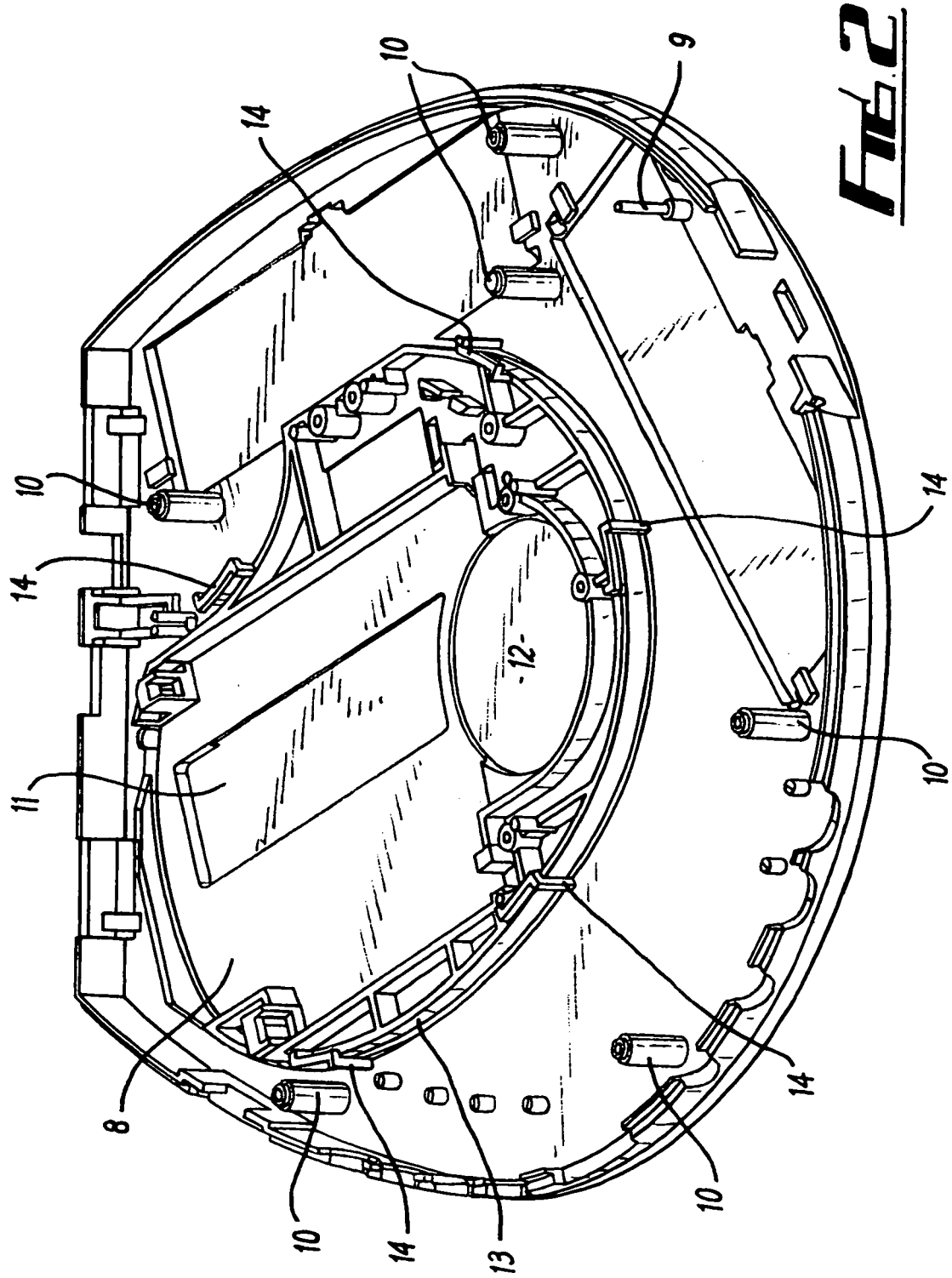

DISC PLAYER IMPROVEMENTS

CROSS-REFERENCE TO RELATED APPLICATIONS

This application claims priority to UK application No. 0127228.5, filed Nov. 23, 2001, which applications is incorporated herein by specific reference.

BACKGROUND OF THE INVENTION

1. The Field of the Invention

The present invention relates to improvements for disc players and in particular, to an improved body design for the disc player.

2. The Relevant Technology

In the following specification the term disc player will be used to refer to compact disc players, recordable compact disc players (CDR), re-writable compact disc players (CDRW) and DVD players, both portable and fixed, all of which are suitable for incorporating the disclosed inventions.

The prior art teaches of disc players that comprise disc enclosures and separate chassis employed to mount a spindle motor and an optical pick-up unit (OPU). Mounting the spindle motor and OPU on a chassis provides a method for controlling the position of the OPU with respect to a rotating disc.

An inherent problem of such chassis is that they are prone to transmit vibrations to the rest of the disc player. These vibrations result from the excitation caused by the disc rotation. The chassis are also subject to disturbances themselves from external vibrations, which can affect the overall performance of the disc player.

To overcome problematic features of such internal and external vibrations the chassis is normally connected to the disc enclosure via rubber anti-vibration (AV) mounts. These AV mounts are additional components that require the development of mould tools in order to provide for their manufacture, as well as their specific construction and incorporation within the assembly procedure. Such procedures add significant cost to the manufacture process, thus resulting in additional costs being passed onto the consumer.

A further problematic design feature also results from employing a separate chassis and disc enclosure. Due to tolerance levels required in separately manufacturing such components the clearance between the disc and the inner surface of the disc enclosure must be maintained at a minimum value. This significantly hinders the overall miniaturization of such disc players. In addition, wind drag resulting between the spinning disc and the disc enclosure is directionally proportional to the dimensions of the disc enclosure. Therefore the smaller the disc enclosure, the smaller the wind drag. A small wind drag is advantageous in that the current required to drive the spindle motor is reduced. This has particular relevance for portable disc drives that draw current from a battery, as the level of current drawn affects the battery lifetime.

A further problematic design feature taught in the prior art relates to the securing of the disc enclosure. Such securing means, employ latches that lock when the lid of the enclosure is closed. In order to gain access to the disc enclosure, for the placing or removing of a disc, requires the operator to manually overcome the latch.

Within such systems the manual opening of the disc player is not related to the rotation of the disc. Therefore, if the lid is inadvertently opened when the disc player is writing data to a disc the laser safety cut off will immediately stop the write action. Written data will therefore not end by the correct closing procedure for the writing session. Without proper closure of the session the data just written, and all other data on the disc, will not be accessible at a later date and so is effectively lost.

In addition, if the user has access to the disc while it is spinning at high speed there is a risk of personal injury if the user were to touch the edge of the disc. A point to note is that this is not such a problematic feature in traditional portable CD players where the discs spin at 15 Hz however it does become a concern in relation to CDRWs where discs can be driven at up to 120 Hz. It is also possible that a user's hand acting as a break on the spinning disc could cause damage to the spindle motor.

In order to overcome some of these problematic features, the prior art teaches of disc players which incorporate a disc brake employed to stop the disc spinning as soon as the lid is opened. However, these brakes can produce debris and contamination as they come into contact with the disc. They also make placement of the disc on the spindle motor more difficult as the break is required to be moved aside before the disc is deployed.

CDRW or CDR players which employ manually operated lids may also employ write locks to prevent the lid being inadvertently opened. However, these write locks require their own motors, solenoids and gear mechanisms in order to activate the locks when the lid is closed.

BRIEF SUMMARY OF THE INVENTION

It is an object of the present invention to provide a disc player that comprises a one-piece disc enclosure therefore, enhancing the miniaturization of the disc player while reducing the cost of manufacture.

According to a first aspect of the present invention there is provided a disc player comprising a disc enclosure and a chassis section, wherein the disc enclosure and the chassis section are formed as a single integrated unit so enabling the overall miniaturization of the disc player.

Most preferably chassis section comprises a damping system located at the interface between the chassis section and the disc enclosure wherein the damping system acts to dampen the vibrations of the chassis section when the disc player is in operation.

Preferably the damping system comprises a plurality of springs connected between the disc enclosure and the chassis section.

Preferably the disc enclosure comprises a spindle motor locating aperture and an optical pick up unit locating aperture.

Preferably the chassis section further comprises a spindle motor and an optical pick up unit.

Optionally the disc enclosure further comprises a lid locking mechanism.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered limiting of its scope, the invention in its presently understood best mode for making and using the same will be described and explained with additional specificity and detail through the use of the accompanying drawings in which:

FIG. 2 presents a schematic illustration of the underside of the base of the disc player, with a bottom section and a locking mechanism removed;

DETAILED DESCRIPTION OF THE PREFERRED EMBODIMENTS

Figure 1:
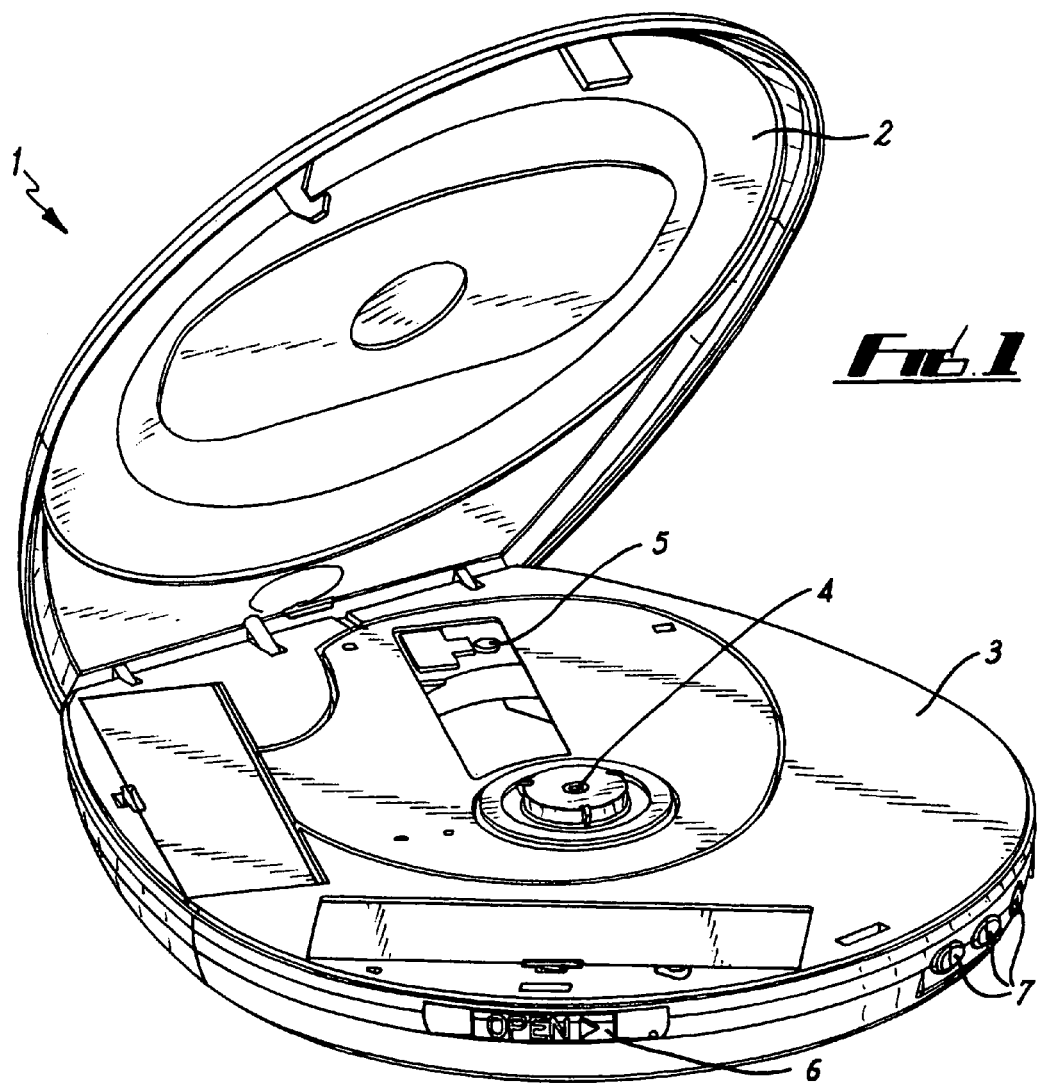
FIG. 1 presents a schematic illustration of disc player in accordance with the present invention.

Referring initially to FIG. 1 a disc player 1 is presented in accordance with the present invention. The disc player 1 can be seen to comprise a lid 2, a base 3, a spindle motor 4 and an optical pick-up unit (OPU) 5. On the perimeter of the base 3 is a locking mechanism 6 (described in detail below) and a series of operating controls 7 for the disc player 1.

Further details of the base 3 are presented in FIG. 2. Here the base 3 is viewed from the underside in the absence of a bottom section and the locking mechanism 6. The base 3 can be seen to further comprise a chassis section 8, a wind vane locating pin 9 and fixing pins 10 for securing the bottom section. The chassis section 8 comprises an OPU locator 11, a spindle motor locator 12 and an integrated damping system 13. The integrated damping system 13 itself comprising five moulded plastic springs 14 located at the perimeter of the chassis section 8.

Figure 3A:
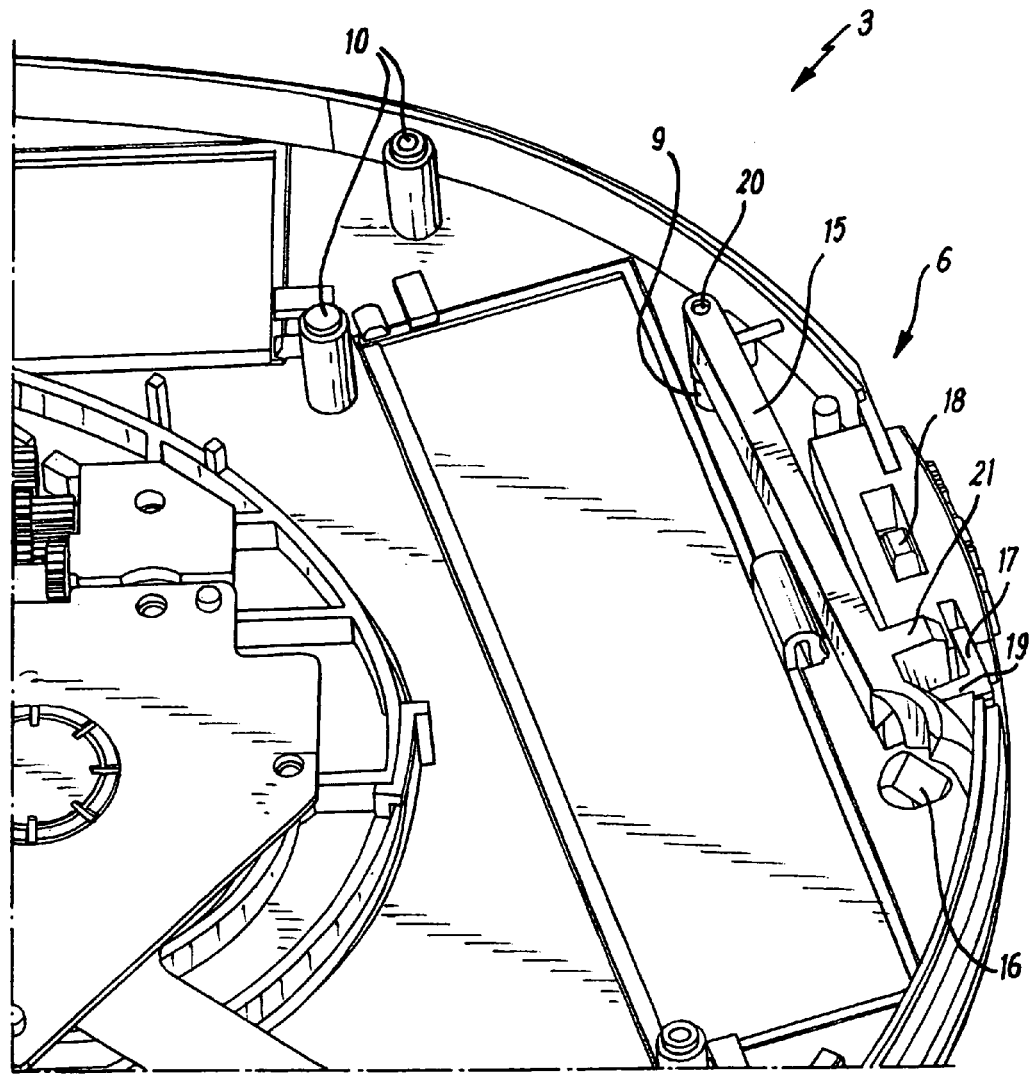
FIG. 3 presents a schematic illustration of a section of FIG. 3 with the locking mechanism present and in:
(a) a locked position; and
(b) an unlocked position.
Figure 3B:
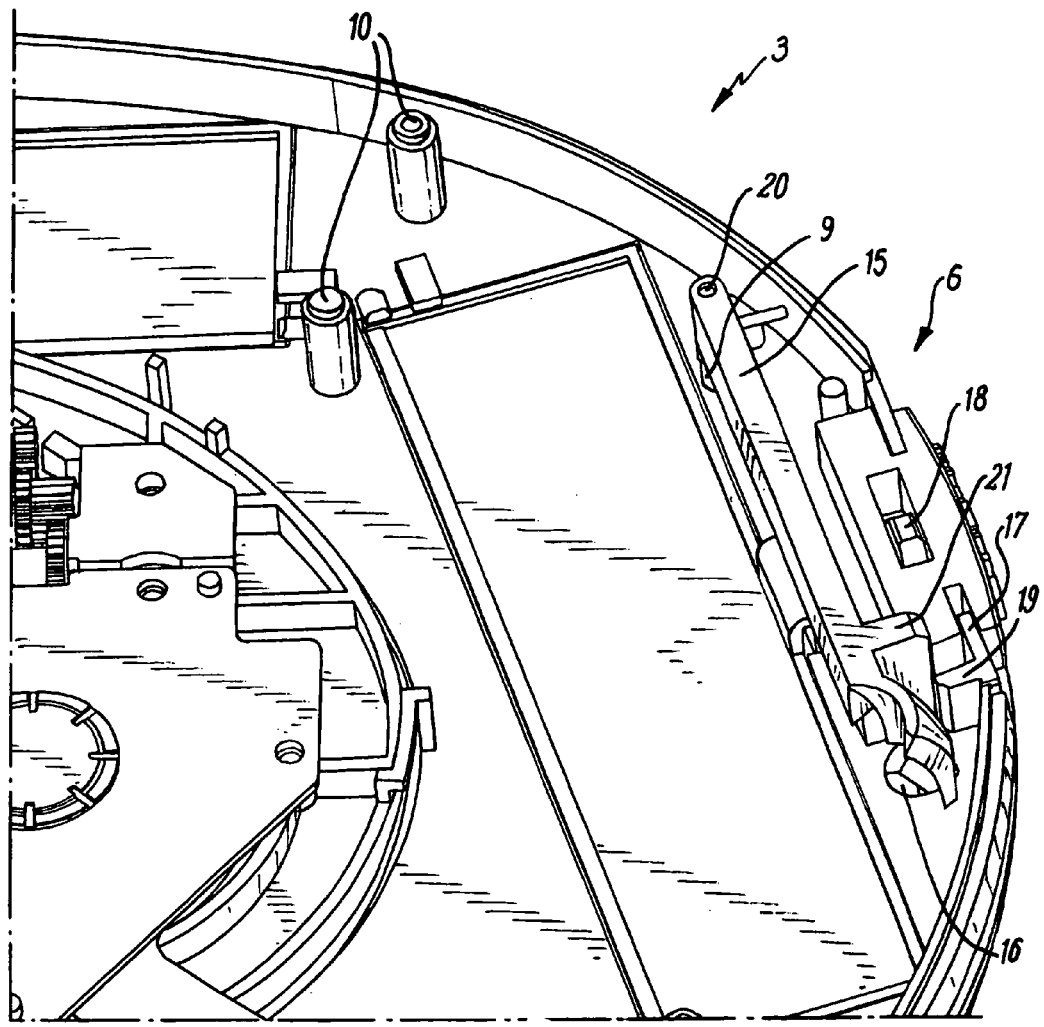

Referring to FIG. 3, details of the locking mechanism 6 can be seen. The locking mechanism 6 comprises a wind vane 15, shown in isolation in FIG. 4, an air vent 16 and a latch 17. The latch further comprises a catch 18 and a side arm 19, while the wind vane 15 comprises a locator 20, a side arm 21 and a bias means (not shown). With the wind vane 15 located such that the locator 20 interacts with the wind vane locating pin 9, the wind vane 15 is free to pivot between a locked position and an unlocked position.

The locking mechanism 6 operates on the following principal. Air pressure generated from the internally spinning disc is employed to activate the wind vane 15, thus moving it from the unlocked position to the locked position. In the locked position the wind vane 15 prevents the manual operation of the latch 17 hence stopping the lid 2 from being opened. When the disc spins the air is drawn to the perimeter of the base 3 thus creating an air pressure build up around the edge of the disc. This air passes through the air vent 16 and wafts against the wind vane 15 causing it to pivot about the wind vane locating pin 9. As long as the disc remains spinning, the airflow is maintained and locking mechanism 6 is maintained in the locked position, preventing the lid 2 from being opened. When the operator requires to open the lid 2, they manually activate the software to stop the disc, thus resulting in the air pressure acting against the wind vane 15 subsiding and so the bias means acts to return the wind vane 15 to the unlocked position.

The present invention has the advantage that the incorporation of an integrated damping system 13 within the base 3 of the disc player 1 eliminates the requirement for the manufacture and assembly of separate rubber AV mounts. Additionally, because the damping system 13 is integrated with the base 3, this component can be manufactured to with greater accuracy, such that that the allowed clearance between the disc and the inner surface of the base 3 can be reduced. This reduction enhances the miniaturisation of the dimensions of the disc player. As a direct result of this miniaturisation the overall wind drag experienced by the disc is reduced, thus having the effect of reducing the current required to drive the spindle motor. An obvious advantage of this will be an increase in the lifetime of battery cells employed by portable disc players.

Further advantages of the present invention are that the locking mechanism 6 prevents the need for a disc break, since the disc will always be stationary before the lid 2 is opened. The locking mechanism 6 also removes the need for the electronics normally associated with a write lock. In addition, since the locking mechanism 6 is activated by the airflow generated by a spinning disc there is no need for it to use any electrical components such as motors, solenoids or associated gear mechanisms. As the locking mechanism 6 draws no current it provides a particularly attractive feature for portable devices that employ battery power sources.

A yet further advantage of the present invention is that as there are no wires or connectors required for the operation of the locking mechanism 6 the disc player 1 is both easier and cheaper to assemble.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilize the invention in various embodiments and with various modifications as are suited to the particular use contemplated. Therefore, further modifications or improvements may be incorporated without departing from the scope of the invention herein intended.

What is claimed is:

1. A disc player housing comprising a disc enclosure and a chassis section, wherein the disc enclosure is continuous with the chassis section formed to form a single unit piece so enabling the overall miniaturization of the disc player.

2. A disc player housing as claimed in claim 1 wherein the chassis section comprises a damping system, located at the interface between the chassis section and the disc enclosure wherein the damping system acts to dampen the vibrations of the chassis section when the disc player is in operation.

3. A disc player housing as claimed in claim 2 wherein the damping system comprises one or more of damping springs connected between the disc enclosure and the chassis section.

4. A disc player housing as claimed in claim 3 wherein the damping springs comprise a flexible plastic.

5. A disc player housing as claimed in claim 1 wherein the disc enclosure comprises a spindle motor locating aperture and an optical pick up unit locating aperture.

6. A disc player housing as claimed in claim 1 wherein the chassis section comprises a spindle motor and an optical pick up unit.

7. A disc player housing as claimed in claim 1 wherein the disc enclosure comprises a lid locking mechanism.

8. A disc player comprising a motor spindle in communication with an optical pick up unit, and a housing configured to house the motor spindle and optical pick up unit, the housing comprising a disc enclosure and a chassis section, wherein the disc enclosure is continuous with the chassis section to form a single piece so enabling the overall miniaturization of the disc player.

9. A disc player housing configured to house a motor spindle and an optical pick up unit in communication with the motor spindle to thereby form a miniaturized disc player, the disc player housing, comprising:
   a disc enclosure; and
   a chassis section linked to the disc enclosure, the chassis section comprising a dampening system having a plurality of plastic springs that link the chassis section to the disc enclosure to provide a dampening effect, such that the chassis section and the disc enclosure are a single piece, the disc player housing being configured to house a motor spindle and an optical pick up unit.

* * * * *

UNITED STATES PATENT AND TRADEMARK OFFICE
CERTIFICATE OF CORRECTION

PATENT NO. : 7,024,674 B2  Page 1 of 1
APPLICATION NO. : 10/289195
DATED : April 4, 2006
INVENTOR(S) : Shepherd et al.

Figure 4:
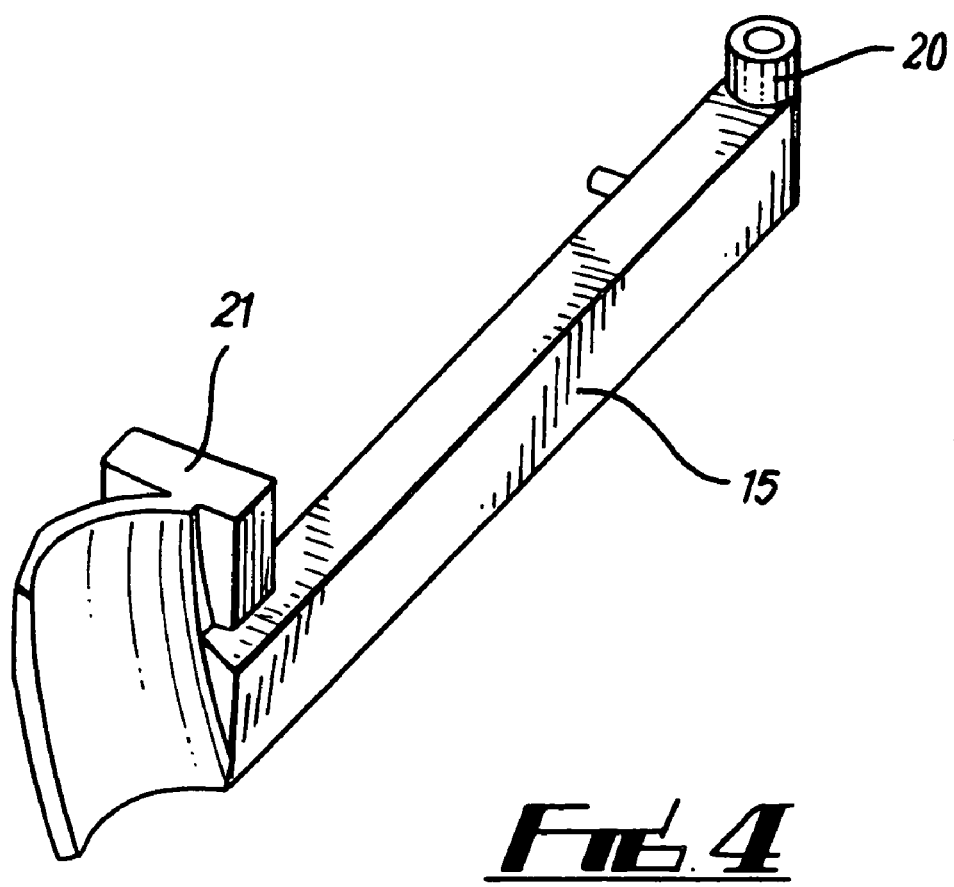
FIG. 4 presents a schematic illustration of a wind vane of the locking mechanism.

It is certified that error appears in the above-identified patent and that said Letters Patent is hereby corrected as shown below:

Column 3
Line 10, before "with", change "FIG. 3" to --FIG. 4--
Line 45, change "principal" to --principle--
Line 67, after "manufactured", remove "to"

Column 4
Line 40, remove "formed"
Line 40, remove "unit"
Line 43, after "system", remove ","

Signed and Sealed this

Fourteenth Day of November, 2006

JON W. DUDAS
*Director of the United States Patent and Trademark Office*